United States Patent
Schall et al.

(10) Patent No.: US 11,247,931 B2
(45) Date of Patent: Feb. 15, 2022

(54) POSITIVE PRESSURE-SUPPORTED GLASS BENDING METHOD AND DEVICE SUITABLE THEREFOR

(71) Applicant: SAINT-GOBAIN GLASS FRANCE, Courbevoie (FR)

(72) Inventors: Guenther Schall, Kreuzau (DE); Michael Balduin, Alsdorf (DE); Herbert Radermacher, Raeren (BE); Jean-Marie Le Ny, Gemmenich (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 275 days.

(21) Appl. No.: 15/741,256

(22) PCT Filed: Dec. 14, 2016

(86) PCT No.: PCT/EP2016/080918
§ 371 (c)(1),
(2) Date: Dec. 30, 2017

(87) PCT Pub. No.: WO2017/129307
PCT Pub. Date: Aug. 3, 2017

(65) Prior Publication Data
US 2018/0186676 A1 Jul. 5, 2018

(30) Foreign Application Priority Data
Jan. 28, 2016 (EP) .................................. 16153047

(51) Int. Cl.
*C03B 23/035* (2006.01)
*C03B 35/14* (2006.01)

(52) U.S. Cl.
CPC ...... *C03B 23/0355* (2013.01); *C03B 23/0357* (2013.01); *C03B 35/145* (2013.01)

(58) Field of Classification Search
CPC ........ C03B 23/035–0357; C03B 23/03; C03B 23/0305; C03B 23/023
See application file for complete search history.

(56) References Cited

U.S. PATENT DOCUMENTS 3,114,571 A    12/1963 Carson et al.
3,473,909 A *  10/1969 Hausheer ............ C03B 23/0352
                                                   65/106
(Continued)

FOREIGN PATENT DOCUMENTS

CA    2861707 A1    9/2013
CN    1130600 A     9/1996
(Continued)

OTHER PUBLICATIONS

International Preliminary Report on Patentability for International Application No. PCT/EP2016/070140 filed Aug. 26, 2016 on behalf of Saint-Gobain Glass France, dated Mar. 13, 2018. 5 pages.
(Continued)

*Primary Examiner* — Jason L Lazorcik
(74) *Attorney, Agent, or Firm* — Pillsbury Winthrop Shaw Pittman LLP

(57) ABSTRACT

The present invention relates to a device for bending at least one glass pane, having
a lower bending mould with a working surface that is suitable for influencing the shape of at least one glass pane,
an upper shaping tool arranged opposite the working surface that is suitable for generating a positive pressure on the surface of the at least one glass pane facing away from the working surface,
where the upper shaping tool has a hollow space with at least one opening oriented toward the lower bending mould and a membrane closing the opening and is equipped with means for introducing a gas into the hollow space in order to
(Continued)

Figure 1:
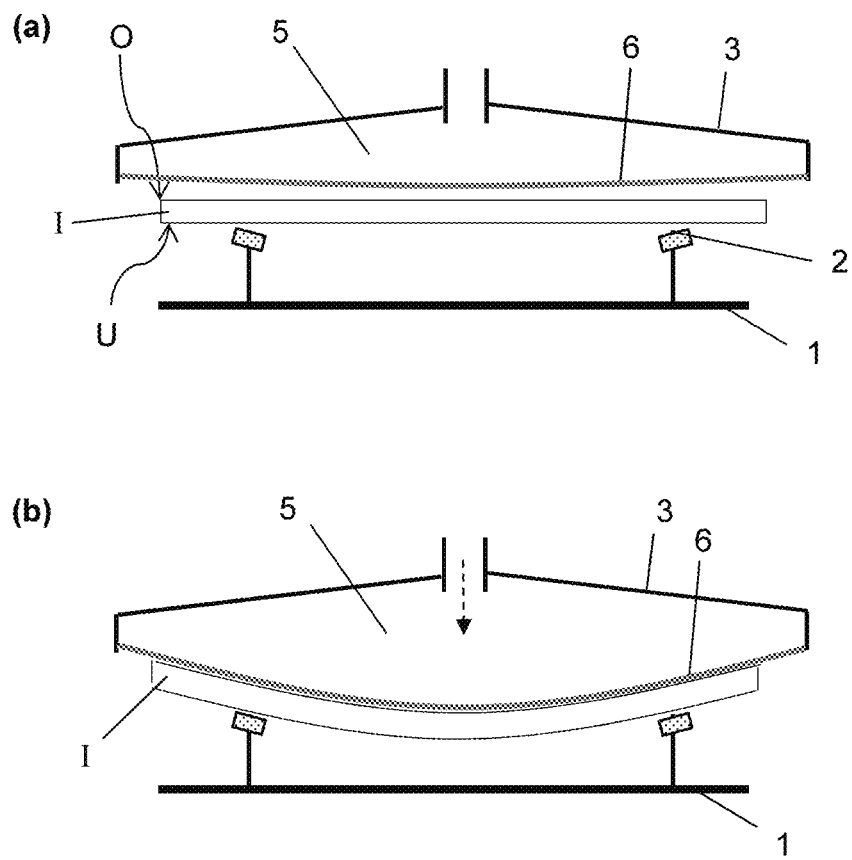

deform the membrane in the direction of the lower bending mould and to thus generate the positive pressure.

15 Claims, 4 Drawing Sheets

(56) References Cited

U.S. PATENT DOCUMENTS

| | | | |
|---|---|---|---|
| 3,484,225 A * | 12/1969 | Bognar | C03B 23/0352 65/103 |
| 3,778,244 A * | 12/1973 | Nedelec | C03B 23/03 65/106 |
| 4,115,090 A | 9/1978 | Comperatore et al. | |
| 4,229,199 A | 10/1980 | Seymour et al. | |
| 4,233,050 A | 11/1980 | Comperatore et al. | |
| 4,504,109 A | 3/1985 | Taga et al. | |
| 4,507,547 A | 3/1985 | Taga et al. | |
| 4,511,386 A | 4/1985 | Kellar et al. | |
| 4,609,391 A * | 9/1986 | McMaster | C03B 23/0252 65/104 |
| 4,666,492 A | 5/1987 | Thimons et al. | |
| 4,678,495 A | 7/1987 | Yoshizawa et al. | |
| 4,709,988 A | 12/1987 | Kai et al. | |
| 4,738,704 A | 4/1988 | Vanaschen et al. | |
| 4,753,669 A * | 6/1988 | Reese | B30B 15/061 65/104 |
| 4,764,196 A | 8/1988 | Boutier et al. | |
| 4,838,920 A * | 6/1989 | Blasquez-Gonzales | C03B 35/163 65/104 |
| 4,877,437 A | 10/1989 | Nitschke | |
| 4,894,080 A * | 1/1990 | Reese | C03B 23/023 65/106 |
| 4,910,088 A | 3/1990 | Baudin et al. | |
| 4,952,227 A | 8/1990 | Herrington et al. | |
| 4,992,088 A * | 2/1991 | Sassanelli | C03B 23/03 65/106 |
| 5,021,075 A * | 6/1991 | Vanaschen | C03B 27/004 65/287 |
| 5,022,906 A * | 6/1991 | Vanaschen | C03B 23/023 65/104 |
| 5,057,265 A | 10/1991 | Cornils et al. | |
| 5,069,703 A * | 12/1991 | d'Iribarne | C03B 40/005 65/104 |
| 5,122,176 A * | 6/1992 | Goettler | C03B 11/14 264/102 |
| 5,203,905 A * | 4/1993 | Kuster | C03B 23/0357 65/107 |
| 5,285,660 A | 2/1994 | Petitcollin et al. | |
| 5,328,496 A | 7/1994 | Lesage et al. | |
| 5,352,263 A * | 10/1994 | Kuster | C03B 23/035 65/106 |
| 5,376,158 A | 12/1994 | Shetterly et al. | |
| 5,383,947 A * | 1/1995 | Montonen | C03B 23/035 65/106 |
| 5,388,432 A * | 2/1995 | Lesage | C03B 23/023 57/238 |
| 5,421,940 A | 6/1995 | Cornils et al. | |
| 5,427,599 A * | 6/1995 | Greschner | B29D 17/005 100/211 |
| 5,472,470 A * | 12/1995 | Kormanyos | C03B 23/03 65/287 |
| 5,492,951 A | 2/1996 | Beyrle et al. | |
| 5,631,067 A * | 5/1997 | Anaf | C03B 40/005 428/213 |
| 5,660,609 A | 8/1997 | Muller et al. | |
| 5,669,952 A | 9/1997 | Claassen et al. | |
| 5,693,112 A * | 12/1997 | Lesage | C03B 23/0305 65/106 |
| 5,713,976 A * | 2/1998 | Kuster | C03B 23/0252 65/106 |
| 5,769,919 A | 6/1998 | Claassen et al. | |
| 5,833,729 A | 11/1998 | Meunier et al. | |
| 5,834,382 A * | 11/1998 | Frebourg | C03B 27/04 442/320 |
| 5,857,358 A * | 1/1999 | De Vries, Jr. | C03B 27/0445 65/106 |
| 5,893,941 A * | 4/1999 | Nikander | C03B 27/0442 65/104 |
| 5,938,810 A * | 8/1999 | De Vries, Jr. | C03B 23/0355 65/268 |
| 6,076,373 A | 6/2000 | Grodziski | |
| 6,138,477 A | 10/2000 | Morin | |
| 6,309,755 B1 | 10/2001 | Matsco et al. | |
| 6,318,125 B1 * | 11/2001 | Diederen | C03B 23/0352 65/102 |
| 6,365,284 B1 | 4/2002 | Liposcak et al. | |
| 6,432,545 B1 | 8/2002 | Schicht et al. | |
| 6,572,990 B1 | 6/2003 | Oyama et al. | |
| 6,668,589 B1 | 12/2003 | Mizusugi et al. | |
| 6,749,926 B1 | 6/2004 | Yoshizawa | |
| 7,231,787 B2 | 6/2007 | Neuman et al. | |
| 7,302,813 B2 | 12/2007 | Balduin et al. | |
| 7,648,768 B2 | 1/2010 | Thiel et al. | |
| 7,655,313 B2 | 2/2010 | Blacker et al. | |
| 8,146,387 B2 | 4/2012 | Ollfisch et al. | |
| 8,327,667 B2 | 12/2012 | Balduin et al. | |
| 8,746,011 B2 * | 6/2014 | Balduin | C03B 23/03 65/106 |
| 8,978,418 B2 * | 3/2015 | Balduin | C03B 23/03 65/107 |
| 9,452,662 B2 * | 9/2016 | Balduin | C03B 23/0357 |
| 9,650,279 B2 | 5/2017 | Balduin et al. | |
| 9,650,291 B2 | 5/2017 | Manz et al. | |
| 2002/0117250 A1 | 8/2002 | Veerasamy | |
| 2002/0189295 A1 | 12/2002 | Bennett et al. | |
| 2002/0192473 A1 | 12/2002 | Gentilhomme et al. | |
| 2003/0182969 A1 | 10/2003 | Dunifon | |
| 2004/0107729 A1 | 6/2004 | Fukami et al. | |
| 2004/0129028 A1 | 7/2004 | Balduin et al. | |
| 2004/0219368 A1 | 11/2004 | Coster et al. | |
| 2005/0002081 A1 | 1/2005 | Beteille et al. | |
| 2005/0123772 A1 | 6/2005 | Coustet et al. | |
| 2005/0142332 A1 | 6/2005 | Sauer | |
| 2006/0182980 A1 | 8/2006 | Barton et al. | |
| 2007/0026238 A1 | 2/2007 | Chiappetta et al. | |
| 2007/0039354 A1 | 2/2007 | Ollfisch et al. | |
| 2007/0157671 A1 * | 7/2007 | Thellier | C03B 23/0252 65/106 |
| 2008/0079045 A1 | 3/2008 | Barton et al. | |
| 2008/0117371 A1 | 5/2008 | Shin et al. | |
| 2008/0134721 A1 | 6/2008 | Maeda | |
| 2008/0134722 A1 | 6/2008 | Balduin et al. | |
| 2008/0190143 A1 * | 8/2008 | Balduin | C03B 35/145 65/106 |
| 2009/0000334 A1 | 1/2009 | Boisselle et al. | |
| 2009/0047509 A1 | 2/2009 | Gagliardi et al. | |
| 2009/0117371 A1 | 5/2009 | Glaeser et al. | |
| 2009/0186213 A1 | 7/2009 | Ihlo et al. | |
| 2009/0277440 A1 | 11/2009 | Angel et al. | |
| 2009/0320824 A1 | 12/2009 | Henn et al. | |
| 2010/0236290 A1 | 9/2010 | Fukami et al. | |
| 2010/0257900 A1 | 10/2010 | Yajima et al. | |
| 2010/0314900 A1 | 12/2010 | Labrot et al. | |
| 2011/0027554 A1 | 2/2011 | Gouardes et al. | |
| 2011/0146172 A1 | 6/2011 | Mauvernay et al. | |
| 2011/0265515 A1 * | 11/2011 | Hernandez Delsol | H05B 6/78 65/29.18 |
| 2012/0045652 A1 | 2/2012 | Zahn et al. | |
| 2012/0055197 A1 | 3/2012 | Balduin et al. | |
| 2012/0070624 A1 | 3/2012 | Payen et al. | |
| 2013/0008209 A1 * | 1/2013 | De Ridder | C03B 23/0252 65/374.11 |
| 2013/0042650 A1 | 2/2013 | Thellier et al. | |
| 2013/0129945 A1 | 5/2013 | Durandeau et al. | |
| 2013/0307286 A1 | 11/2013 | Balduin et al. | |
| 2013/0313852 A1 | 11/2013 | Balduin et al. | |
| 2013/0323415 A1 | 12/2013 | Brackley et al. | |
| 2013/0340479 A1 | 12/2013 | Balduin et al. | |
| 2014/0010976 A1 | 1/2014 | Gerardin et al. | |

(56) References Cited

U.S. PATENT DOCUMENTS

| | | | |
|---|---|---|---|
| 2014/0011000 A1* | 1/2014 | Dunkmann | B60J 1/008 |
| | | | 428/174 |
| 2014/0230493 A1 | 8/2014 | Balduin et al. | |
| 2015/0146286 A1 | 5/2015 | Hagen et al. | |
| 2016/0002100 A1 | 1/2016 | Melcher et al. | |
| 2016/0340479 A1 | 11/2016 | Crossley | |
| 2017/0210663 A1 | 7/2017 | Balduin et al. | |
| 2017/0217820 A1 | 8/2017 | Balduin et al. | |
| 2018/0111355 A1 | 4/2018 | Manz et al. | |
| 2018/0170790 A1* | 6/2018 | Le Ny | C03B 23/0256 |
| 2018/0179099 A1 | 6/2018 | Le Ny et al. | |
| 2018/0194664 A1 | 7/2018 | Balduin et al. | |

FOREIGN PATENT DOCUMENTS

| | | |
|---|---|---|
| CN | 1518524 A | 8/2004 |
| CN | 1531510 A | 9/2004 |
| CN | 2641043 Y | 9/2004 |
| CN | 1651345 A | 8/2005 |
| CN | 1764607 A | 4/2006 |
| CN | 101875536 A | 11/2010 |
| CN | 101888927 A | 11/2010 |
| DE | 3615225 A1 | 11/1987 |
| DE | 3930414 A1 | 3/1991 |
| DE | 4232554 C1 | 1/1994 |
| DE | 4337559 C1 | 3/1995 |
| DE | 4334213 A1 | 4/1995 |
| DE | 19604397 C1 | 7/1997 |
| DE | 69219496 T2 | 12/1997 |
| DE | 69423700 T2 | 10/2000 |
| DE | 10105200 A1 | 8/2002 |
| DE | 10314266 B3 | 6/2004 |
| DE | 102005001513 B3 | 6/2006 |
| DE | 102007059323 A1 | 6/2009 |
| EA | 027316 B1 | 7/2017 |
| EP | 0262046 A2 | 3/1988 |
| EP | 0434656 A2 | 6/1991 |
| EP | 0515847 A2 | 12/1992 |
| EP | 0531152 A2 | 3/1993 |
| EP | 0536607 A2 | 4/1993 |
| EP | 0576179 A1 | 12/1993 |
| EP | 0613865 A1 | 9/1994 |
| EP | 0677491 A2 | 10/1995 |
| EP | 0706978 A2 | 4/1996 |
| EP | 1047644 B1 | 1/2003 |
| EP | 1281613 A2 | 2/2003 |
| EP | 1358131 A2 | 11/2003 |
| EP | 1371616 A1 | 12/2003 |
| EP | 0877006 B1 | 1/2006 |
| EP | 1611064 A2 | 1/2006 |
| EP | 1836136 A1 | 9/2007 |
| EP | 1218307 B1 | 7/2008 |
| EP | 1917222 B1 | 3/2009 |
| EP | 2141135 A1 | 1/2010 |
| EP | 2233444 A1 | 9/2010 |
| EP | 2247549 A2 | 11/2010 |
| EP | 2463247 A1 | 6/2012 |
| EP | 2463248 A1 | 6/2012 |
| EP | 2639032 A1 | 9/2013 |
| EP | 2639032 B1 | 9/2014 |
| FR | 2097019 A1 | 3/1972 |
| GB | 813069 A | 5/1959 |
| JP | S4621038 Y1 | 7/1971 |
| JP | S49110710 A | 10/1974 |
| JP | S5130085 B1 | 8/1976 |
| JP | S5243855 B1 | 2/1977 |
| JP | S63027443 U | 2/1988 |
| JP | S63156027 A | 6/1988 |
| JP | H03504003 A | 9/1991 |
| JP | H05147959 A | 6/1993 |
| JP | H05195201 A | 8/1993 |
| JP | H0640732 A | 2/1994 |
| JP | H06256030 A | 9/1994 |
| JP | H08183626 A | 7/1996 |

| | | |
|---|---|---|
| JP | 2002527349 A | 8/2002 |
| JP | 2006256902 A | 9/2006 |
| JP | 2006521271 A | 9/2006 |
| JP | 2006528932 A | 12/2006 |
| JP | 2008526659 A | 7/2008 |
| JP | 2010013345 A | 1/2010 |
| JP | 2013529170 A | 7/2013 |
| JP | 2014500222 A | 1/2014 |
| JP | 2014504229 A | 2/2014 |
| KR | 20040037078 A | 5/2004 |
| KR | 20070088745 A | 8/2007 |
| KR | 101343631 B1 | 12/2013 |
| KR | 20140019312 A | 2/2014 |
| RU | 2009107 C1 | 3/1994 |
| RU | 2036861 C1 | 6/1995 |
| RU | 2098362 C1 | 12/1997 |
| RU | 2444478 C1 | 3/2012 |
| RU | 2550611 C1 | 5/2015 |
| SU | 743955 A1 | 6/1980 |
| WO | 00/29347 A1 | 5/2000 |
| WO | 02/064519 A1 | 8/2002 |
| WO | 03/024649 A1 | 3/2003 |
| WO | 2004/087590 A2 | 10/2004 |
| WO | 2006/043026 A1 | 4/2006 |
| WO | 2006/072721 A1 | 7/2006 |
| WO | 2007/042688 A1 | 4/2007 |
| WO | 2010/074548 A1 | 7/2010 |
| WO | 2010/136702 A1 | 12/2010 |
| WO | 2011/088330 A2 | 7/2011 |
| WO | 2011/105991 A1 | 9/2011 |
| WO | 2012/022876 A2 | 2/2012 |
| WO | 2012/080071 A1 | 6/2012 |
| WO | 2012/080072 A1 | 6/2012 |
| WO | 2012/118612 A1 | 9/2012 |
| WO | 2012/131243 A1 | 10/2012 |
| WO | WO 2012/176813 A1 | 12/2012 |
| WO | 2013/131667 A1 | 9/2013 |
| WO | WO 2013/146264 A1 | 10/2013 |
| WO | 2014/166793 A1 | 10/2014 |
| WO | 2016/066309 A1 | 5/2016 |
| WO | 2016/066310 A1 | 5/2016 |
| WO | 2017/029252 A1 | 2/2017 |
| WO | 2017/042037 A1 | 3/2017 |
| WO | 2017/089070 A1 | 6/2017 |
| WO | 2017/129307 A1 | 8/2017 |

OTHER PUBLICATIONS

International Preliminary Report on Patentability for International Application No. PCT/EP2016/080918 filed Dec. 14, 2016 on behalf of Saint-Gobain Glass France, dated Jul. 31, 2017. 6 pages (English Translation + German Original).

International Search Report for International Application No. PCT/EP2015/070430 filed on Sep. 8, 2015 in the name of Saint-Gobain Glass France, dated Nov. 24, 2015. 8 pages. (English translation + German original).

International Search Report for International Application No. PCT/EP2015/070432 filed on Sep. 8, 2015 on behalf of Saint-Gobain Glass France, dated Dec. 7, 2015. 7 pages. (English translation + German original).

International Search Report for International Application No. PCT/EP2016/069317 filed on Aug. 15, 2016 on behalf of Saint-Gobain Glass France, dated Oct. 19, 2016. 5 Pages. (German Original + English Translation).

International Search Report for International Application No. PCT/EP2016/070140 filed Aug. 26, 2016 on behalf of Saint-Gobain Glass France, dated Oct. 19, 2016. 9 pages. (German Original + English translation).

International Search Report for International Application No. PCT/EP2016/076072 filed Oct. 28, 2016 on behalf of Saint-Gobain Glass France, dated Jan. 13, 2017. 5 pages. (German + English Translation).

Non-Final Office Action for U.S. Appl. No. 15/328,471, filed Jan. 23, 2017, on behalf of Saint-Gobain Glass France, dated Dec. 11, 2018. 14 pages.

(56) References Cited

OTHER PUBLICATIONS

Non-Final Office Action for U.S. Appl. No. 15/328,475, filed Jan. 23, 2017 on behalf of Saint-Gobain Glass France, dated Mar. 18, 2019. 16 pages.
Non-Final Office Action for U.S. Appl. No. 15/578,699, filed Nov. 30, 2017 on behalf of Saint-Gobain Glass France dated Jun. 7, 2019 32 pages .
Restriction Requirement for U.S. Appl. No. 15/328,471, filed Jan. 23, 2017, on behalf of Saint-Gobain Glass France, dated Aug. 30, 2018. 7 pgs.
Restriction Requirement for U.S. Appl. No. 15/578,699, filed Nov. 30, 2017 on behalf of Saint-Gobain Glass France, dated Apr. 9, 2019. 7 pages.
International Preliminary Report on Patentability for International Application No. PCT/EP2015/070432 filed on Sep. 8, 2015 in the name of Saint-Gobain Glass France, dated May 2, 2017. 8 pages.
International Preliminary Report on Patentability for International Application No. PCT/EP2016/069317 filed Aug. 15, 2016 on behalf of Saint-Gobain Glass France, dated Feb. 20, 2018. 5 pages.
International Preliminary Report on Patentability for International Application No. PCT/EP2016/076072 filed Oct. 28, 2016 on behalf of Saint-Gobain Glass France, dated May 29, 2018. 7 pages. (German Original + English Translation).
International Preliminary Report on Patentability for International Application No. PCT/EP2015/070430 filed Sep. 8, 2015 on behalf of Saint-Gobain Glass France, dated May 2, 2017. 7 pages.
Written Opinion for International Application No. PCT/EP2016/070140 filed Aug. 26, 2016 on behalf of Saint-Gobain Glass France, dated Oct. 19, 2016. 9 pages. (German Original + English translation).
Written Opinion for International Application No. PCT/EP2015/070430 filed Sep. 8, 2015 on behalf of Saint-Gobain Glass France, dated Nov. 24, 2015. 12 pages. (English Translation + German Original).
Written Opinion for International Application No. PCT/EP2015/070432 filed Sep. 8, 2015 on behalf of Saint-Gobain Glass France, dated Dec. 7, 2015. 14 pages. (English Translation + German Original).
Written Opinion for International Application No. PCT/EP2016/076072 filed Oct. 28, 2016 on behalf of Saint-Gobain Glass France, dated Jan. 13, 2017. 12 pages. (German + English Translation).
Written Opinion for International Patent Application No. PCT/EP2016/069317 filed on Aug. 15, 2016 on behalf of Saint-Gobain Glass France, dated Oct. 19, 2016. 9 pages. (German Original + English Translation).
Final Office Action for U.S. Appl. No. 15/328,471, filed Jan. 23, 2017 on behalf of Saint Gobain Glass France dated May 15, 2019 9 pages.
Final Office Action for U.S. Appl. No. 15/328,475, filed Jan. 23, 2017 on behalf of Saint Gobain Glass France dated Aug. 27, 2019 17 pages.
Final Office Action for U.S. Appl. No. 15/578,699, filed Nov. 30, 2017 on behalf of Saint-Gobain Glass France dated Sep. 3, 2019 20 pages.
Indian First Examination Report for IN Application No. 201837004251 filed on Feb. 5, 2018 on behalf of Saint Gobain Glass France dated Jun. 28, 2019 5 pages.
Restriction Requirement for U.S. Appl. No. 15/741,264, filed Dec. 31, 2017 on behalf of Saint-Gobain Glass France dated Sep. 17, 2019 7 pages.
Russian Office Action for RU Application No. 2018115725/03 filed on Dec. 14, 2016 on behalf of Saint Gobain Glass France dated Apr. 24, 2019 5 pages (English Translation Only).
Written Opinion for International Application No. PCT/EP2016/080918 filed Dec. 14, 2016 on behalf of Saint-Gobain Glass France, dated Feb. 13, 2017. 9 pages (English Translation + German Original).
International Search Report for International Application No. PCT/EP2016/080918 filed on Dec. 14, 2016 in the name of Saint-Gobain Glass France, dated Feb. 13, 2017. 7 pages (German Original + English translation).

\* cited by examiner

POSITIVE PRESSURE-SUPPORTED GLASS BENDING METHOD AND DEVICE SUITABLE THEREFOR

CROSS REFERENCE TO RELATED APPLICATIONS

The present application is the U.S. national stage of International Patent Application PCT/EP2016/080918 filed internationally on Dec. 14, 2016, which, in turn, claims priority to European Patent Application No. 16153047.2 filed on Jan. 28, 2016.

The invention relates to a positive pressure-supported bending method for glass panes, a device suitable therefor as well as the use of a membrane in such a bending process.

Glazings for motor vehicles typically have a bend. Various methods for generating such a bend are known. In so-called "gravity bending" (also known as sag bending), the glass pane, flat in the initial state, is arranged on the supporting surface of a bending mould and is heated to at least its softening temperature such that it rests, under the influence of gravity, on the supporting surface. In the so-called "press bending method", the pane is arranged between two complementary tools that act together on the pane to generate the bend. In press bending, strictly speaking, this is a pressing action between the tools. In suction bending methods, at least one of the tools exerts a sucking action on the pane to obtain or to support the deformation.

In order to realise complex pane shapes, multistage bending methods are frequently used. Typically, in a first bending step, a pre-bend is generated using gravity bending, whereas the final shape is produced in a second bending step—frequently by means of press bending or suction bending. Such multistage bending methods are known, for example, from EP 1 836 136 A1, EP 1 358 131 A1, EP 2 463 247 A1, EP 2 463 248 A1, US 2004107729 A1, EP 0 531 152 A2, and EP 1 371 616 A1.

Also known are positive pressure-supported bending methods. Thus, gravity bending can be accelerated in that positive pressure that presses, so to speak, the glass pane into the gravity bending mould, is exerted from above. Thus, lower bending temperatures and/or shorter bending cycles can be achieved. Thus, EP 0 706 978 A2 proposes a gravity bending method wherein a stream of air is introduced onto the glass pane with an upper shaping tool in order to produce the positive pressure.

Some glazings for vehicles are implemented as laminated safety glazings, in particular windshields. These are made of two glass panes that are laminated together via a polymeric intermediate layer. Here, it can be advantageous to bend the two glass panes together congruently in order to optimally match their bend to one another. Such methods are known, for example, from EP 1 358 131 A1, EP 2 463 247 A1, EP 2 463 248 A1, EP 1 836 136 A1, EP 0 531 152 A2, and EP 1 611 064 A1.

In the case of such pairwise bending methods, it is necessary to avoid separation of the two glass panes, i.e., the formation of a gap between the panes during the bending process. This is particularly true in connection with suction bending methods since the negative pressure acting on one pane surface particularly favors such gap formation. In order to counter the risk of gap formation, a positive pressure can be applied opposing the suction in order to press the two panes against each other. Thus, KR 101 343 631 B1 proposes shaping the lower pane by suction and simultaneously subjecting the upper pane to a stream of air.

Common to the above-described positive pressure-supported bending methods is the fact that, to generate the positive pressure, the glass pane to be bent is directly subjected to a stream of air. However, this poses the risk that the surface of the glass pane will be adversely affected, a situation which can, in particular, result in reduced optical quality of the glass pane. Thus, inhomogeneous exposure to the stream of air, as results, for example, from the use of nozzles, can cause inhomogeneous transmittance behavior of the pane, which is undesirable for window panes and is acceptable only to a very limited extent.

U.S. Pat. No. 3,473,909 A discloses a device and a method for bending a glass lens using a membrane, by means of which the glass lens is pressed into a lower bending mould.

The object of the present invention is to provide an improved positive pressure-supported bending method for glass panes, in particular window panes, and a device suitable therefor, wherein the above-described disadvantages are avoided. In particular, impairment of the optical quality of the glass pane as result of exposure to positive pressure should be avoided.

The object of the invention is accomplished according to the invention by a device for bending at least one glass pane, at least comprising
- a lower bending mould with a working surface that is suitable for influencing the shape of at least one glass pane,
- an upper shaping tool arranged opposite the working surface that is suitable for generating a positive pressure on the surface of the at least one glass pane facing away from the working surface, wherein the upper shaping tool has a hollow space with at least one opening oriented toward the lower bending mould and a membrane closing the opening and is equipped with means for introducing a gas into the hollow space in order to deform the membrane in the direction of the lower bending mould and to thus generate the positive pressure.

In the context of the invention, the term "membrane" means a flat element made of a flexible material, which (under the typical conditions of use) is elastically deformable in the surface normal direction.

The object of the invention is also accomplished by a method for bending at least one glass pane, at least comprising the following process steps:

(a) Arranging at least one glass pane heated to at least its softening temperature between a lower bending mould and an upper shaping tool, wherein the upper shaping tool is arranged opposite a working surface of the lower bending mould and has a hollow space with at least one opening oriented toward the lower bending mould and a membrane closing the opening, (b) Introducing a gas into the hollow space, by means of which the membrane is deformed in the direction of the lower bending mould such that the membrane contacts the surface of the at least one glass pane facing away from the supporting surface, thus exerts pressure, and generates a positive pressure on said surface, (c) Cooling the glass pane.

The device and the method are presented together in the following, with explanations and preferred embodiments referring equally to the device and the method.

The invention also includes an arrangement for bending at least one glass pane, comprising the device according to the invention and a glass pane that is positioned between the lower bending tool and the upper shaping tool.

The bending method to be carried out with the device according to the invention can be referred to as a positive pressure-supported bending method. The shaping of the glass pane by the lower bending mould is supported in that a positive pressure is exerted from above on the glass pane. By means of the positive pressure, faster bending can be achieved. In the simultaneous bending of a plurality of stacked glass panes, the formation of a gap between the panes can be prevented. The positive pressure is generated according to the invention by means of a flexible membrane. This has proved to be an advantageously gentle procedure by means of which negative impairments of the glass pane can be avoided, in particular, impairments of surface quality and optical properties. This is a major advantage of the present invention. Due to the flexibility of the membrane, it constantly adapts to the pane shape predefined by the working surface of the lower bending mould. Consequently, the upper shaping tool according to the invention need not be coordinated with the respective pane shape, but, instead, can be used, as it were, as a universal tool for a variety of different pane shapes.

The device according to the invention for bending at least one glass pane comprises at least a lower bending mould and an upper shaping tool. The glass pane to be bent is arranged between the lower bending mould and the upper shaping tool. For this purpose, the glass pane can, for example, be placed down on the lower bending mould or suctioned by the upper shaping tool.

In the context of the invention, the term "a lower bending mould" means a mould that contacts the lower surface of the glass pane facing the ground or is associated therewith and acts thereon. The term "an upper bending mould" means a mould that is associated with the upper surface of the glass pane facing away from the ground and acts thereon.

The lower bending mould has a working surface that is associated with the glass pane and acts thereon for shaping the glass pane. The working surface is suitable for influencing the shape of the at least one glass pane. The working surface can also be referred to as a supporting surface or contact surface because it is suitable for arranging at least one glass pane thereon or for making contact with the glass pane. The working surface defines the shape of the bent glass pane. Typically, at the beginning of the bending step, only a part of the working surface is in contact with the glass pane and the glass pane rests on the working surface during the course of the bending step. This can be done under the influence of gravity, a pressing pressure, or a sucking action. The working surface can be in direct contact with the glass pane. However, the working surface can, for example, also be provided with a fabric that is arranged between the actual working surface and the glass pane.

The present invention is not restricted to a specific type of working surface. The working surface is preferably concave. The term "a concave mould" means a mould in which the corners and edges of the glass pane, in the intended contact with the working surface, are bent in the direction away from the bending mould.

In an advantageous embodiment, the lower bending mould has a full-surface working surface. Such a working surface can also be referred to as solid and, at the end of the bending step, is in contact with most of the pane surface—in contrast with so-called "frame-like" working surfaces. In a particularly preferred embodiment, the full-surface working surface is equipped with holes or openings through which a sucking action can be exerted on the surface of the at least one glass pane facing the working surface. Such a bending mould is suitable, in particular, for a suction bending step. It can also be used to exert a pressing pressure in the edge region and a sucking action in the central region. In this case, the device also includes means for generating a sucking action that are connected to the working surface, for example, venturi nozzles, fans, or pumps. Such a lower bending mould can also be referred to as a suction bending mould. The lower bending mould corresponds, in this embodiment in particular, to the lower mould ("forme inférieur 5,12") that is described in EP 1 836 136 A1.

In another advantageous embodiment, the lower bending mould has a frame-like working surface. Only the frame-like working surface is in direct contact with the glass pane, while most of the pane has no direct contact with the mould. Thus, panes with particularly high optical quality can be produced. Such a mould can also be referred to as a ring (bending ring) or frame (frame mould). In the context of the invention, the term "frame-like working surface" serves merely for differentiation relative to a full-surface mould. The working surface need not form a complete frame, but can even be discontinuous. The working surface is implemented in the form of a complete frame or a discontinuous frame. Such a frame-like working surface is suitable, in particular, as a gravity bending mould such that the lower mould in this case is preferably implemented as a gravity bending mould. The pane is placed down onto the gravity bending mould such that the working surface (support surface) touches the lower surface of the glass pane, which faces the ground. Usually, the edge region of the glass pane protrudes circumferentially beyond the working surface. When the glass pane is heated to at least its softening temperature, it rests, under the influence of gravity, on the working surface, by which means the desired shape is achieved. The frame-like working surface can, however, also be used for press bending methods.

The advantage of the frame-like working surface compared to the full-surface working surface resides in the higher optical quality of the bent pane. It was surprising for the person skilled in the art that the method according to the invention can also be carried out with the use of such a frame-like working surface, even though there is, in the central region of the pane, no counter pressure against the pressure exerted by the membrane. Nevertheless, reliable and reproducible bending of glass panes is possible.

The width of the frame-shaped working surface is preferably from 0.1 cm to 20 cm, particularly preferably from 0.1 cm to 5 cm, for example, 0.3 cm.

In principle, combinations of the above-described types of working surfaces are also conceivable, for example, a full-surface working surface in the central region, which is surrounded by a frame-like working surface.

The surface of the glass pane facing away from the lower bending mould is subjected, according to the invention, by means of the membrane of the upper shaping tool to a positive pressure. The surface of the glass pane facing away from the lower bending mould can also be referred to as the upper surface; and the surface facing the lower bending mould, as the lower surface. In the context of the invention, the term "positive pressure" means a pressure that is higher than the ambient pressure. By means of the positive pressure, the softened glass pane is, as it were, pressed into the lower bending mould.

During the bending procedure, the upper shaping tool is arranged opposite the working surface of the lower bending mould such that a glass pane can be arranged between the lower bending mould and the upper shaping tool. It is suitable for generating a positive pressure on the surface of the glass pane arranged on the supporting surface facing away from the supporting surface.

Various embodiments of the upper shaping tool are conceivable. Common to all of them is the fact that the shaping tool has a hollow space. The hollow space is not a closed hollow space. Thus, the shaping tool is, on the one hand, equipped with means for introducing a gas into the hollow space, which include, in particular, an inflow pipe opening into the hollow space or an inflow opening. On the other, the hollow space has at least one additional opening that is oriented toward the lower bending mould.

The shaping tool also has a membrane that covers or seals the at least one opening oriented toward the lower bending mould. When gas is introduced into the hollow space and generates a positive pressure there, the membrane is deformed elastically in the direction of the lower bending mould. By means of the direct contact of the membrane with the upper surface of the glass pane, the positive pressure on the glass pane according to the invention is generated.

In an advantageous embodiment, the upper shaping tool has a cover with an edge section that surrounds the opening. In this case, the shaping tool is implemented not as a mould with a full-surface contact surface, but rather as a hollow mould. The cover is, for example, made from a metal sheet. The cover is shaped such that it forms the hollow space, with the opening oriented toward the lower bending mould being a single large opening. The mould can be characterised as bell-like or hood-like. The membrane closes the bell-like hollow space. The membrane is typically attached in the region of the edge section.

In the intended arrangement of the shaping tool, the edge section of the cover is preferably oriented downward. The edge section is, particularly preferably, arranged substantially vertically. Thus, the shaping tool can advantageously be brought into contact with the glass pane. The downward oriented edge section is frequently also referred to as a skirt. The side edge of the cover can be arranged on the end of the downward oriented edge section and point downward. However, it does not impair the function if, for example, the end of the edge section is bent such that the side edge does not point downward.

When the upper shaping tool is lowered onto the glass pane, a part of this shaping tool preferably rests on the glass pane, with the membrane possibly arranged between this part and the glass pane. Said part of the shaping tool is consequently referred to as a contact surface. The contact surface can be formed by the side edge or an end section of the cover or specially mounted on the cover in the region of the side edge.

The material thickness of the upper shaping tool or its cover in the hood-like configuration is preferably at most 5 mm, particularly preferably from 2 mm to 4 mm. The weight of the shaping tool can can be kept low as a result of these low material thicknesses.

However, the shaping tool need not be implemented hood-like. In another advantageous embodiment, the upper shaping tool has a wall delimiting the hollow space and oriented toward the lower bending mould, into which wall a plurality of openings are introduced. In this case, the upper shaping tool is implemented as a solid mould comprising a hood-like cover and a wall closing the opening of this hood-like cover, which wall is provided with openings or holes. The surface of said wall facing away from the hollow space forms, in this case, the contact surface, which is preferably lowered onto the pane. The membrane covers this contact surface and is pushed away from the wall by the gas flowing through the openings and expands. The size of the openings is preferably from 20 mm$^2$ to 700 mm$^2$, particularly preferably from 30 mm$^2$ to 100 mm$^2$. The share of the surface area occupied by the openings is preferably from 5 to 50% of the entire area of the wall (which also includes the area of the openings), particularly preferably from 10% to 30%. Thus, a particularly uniform deformation of the membrane is achieved.

The material thickness of the upper shaping tool or its cover in the configuration as a solid mould is preferably from 10 mm to 30 mm.

In both configurations, the upper shaping tool or its cover is preferably made of steel or stainless steel.

The contact surface of the upper shaping tool is preferably implemented complementary to the working surface of the lower bending mould. Since the lower bending mould preferably has a concave working surface, the contact surface of the upper shaping tool is preferably convex.

The positive pressure should be generated on the greatest possible share of the surface of the glass pane. The positive pressure should be generated at least on the regions of the glass pane that rest (in the bent state) on the working surface of the lower bending mould as well as, in the case of a frame-like working surface, the region surrounded thereby. For example, the membrane can be in contact with at least 80% or at least 90% of the surface of the glass pane to be bent and act thereon in order to generate the positive pressure, with the regions not in contact with the membrane and, consequently, not subjected to positive pressure arranged in its edge region, in particular circumferentially.

In an advantageous embodiment, the upper shaping tool is suitable for holding the at least one glass pane to be bent. Thus, in addition to the generation of the positive pressure according to the invention, the upper shaping tool can also be used to lift and to move the at least one pane. For holding the glass pane, a sucking action that presses the glass pane against the upper shaping tool is preferably exerted. This sucking action is particularly preferably generated by the so-called skirt technique, which is described in the following.

In the skirt technique, the part of the upper shaping tool provided with the membrane, which part is necessary for generating the positive pressure, as well as the contact region is arranged above the pane surface, in the sense that the projection of the membrane surface in the plane of the glass pane (which is flat in the initial state) is arranged completely inside the pane area—thus, the membrane does not protrude beyond the pane area. In this case, there can be an edge region (in particular, a circumferential edge region) of the pane surface that does not come into contact with the membrane. When the upper shaping tool is lowered onto the glass pane, its contact surface rests against the glass pane, with the membrane possibly arranged between the contact surface and the glass pane.

The shaping tool has, for generating the sucking action, a peripheral air deflector plate, which surrounds the contact surface, the membrane, and the opening to the hollow space according to the invention at least in regions. Such an air deflector plate is frequently also referred to as a skirt. The air deflector plate surrounds or frames the contact surface and the opening, say completely or in sections. During the bending procedure, the air deflector plate preferably has a distance from the side edges of the glass pane of 3 mm to 50 mm, particularly preferably of 5 mm to 30 mm, for example, 20 mm.

The sucking action that is necessary for holding the glass pane against the contact surface of the upper shaping tool, is generated by exhausting the air between the air deflector plate and the contact surface (and the cover of the hollow space according to the invention supporting it). This is suitable for sweeping the edge of the glass pane to be bent with a stream of air, at least in sections, and thus pressing the glass pane against the contact surface. The device includes means for generating a negative pressure or a sucking action, for example, fans, venturi nozzles, or pumps that are associated with the air deflector plate. The stream of air generated is guided by the air deflector plate such that the side edge of the glass pane is swept at least in sections. By means of the air deflector plate and the means for generating the sucking action, the shaping tool is suitable for sweeping the edge of the at least one glass pane with a stream of air. The glass pane is effectively held against the shaping tool by the stream of air pressed or sucked against the contact surface. The glass pane is held against the shaping tool by the stream of air sweeping the edge against the action of gravity. An upper mould with skirt technology is described, for example, in EP 1 836 136 A1 ("forme supérieure 11").

In a preferred embodiment, the membrane is gas permeable. This causes a sort of pressure equalization such that the pressure immediately above and below the membrane is approx. the same. Thus, it is possible to avoid creating imprints of the membrane on the glass surface that would reduce the optical quality of the pane. Of course, the membrane must not be gas permeable to such an extent that it poses no resistance to the stream of air and is thus not inflated and deformed. The suitable extent of gas permeability can be selected by the person skilled in the art according to the requirements of the individual case, for example, by simulations or simple preliminary tests.

The membrane is preferably made of a felt, fleece, or woven fabric. The gas permeability can be affected by the characteristics, in particular the thickness of the felt, fleece, or fabric.

The felt, fleece, or fabric is preferably metal-containing, particularly preferably stainless steel-containing. The felt, fleece, or fabric is preferably a stainless steel felt, stainless steel fleece, or stainless steel fabric. These materials have, on the one hand, adequate stability for industrial mass production and are, on the other, soft enough to not damage the glass surface.

The membrane preferably has a thickness (material thickness) of 0.5 mm to 10 mm, particularly preferably of 1 mm to 5 mm, most particularly preferably of 2 mm to 3 mm. In this range, an advantageous compromise between stability and flexibility is achieved. In addition, the membrane is thin and light enough to avoid imprints on the glass pane.

The device according to the invention also includes means for moving the lower bending mould and the upper shaping tool toward each other. By these means, the lower bending mould and the shaping tool are brought near each other after the glass pane has been positioned for bending such that they can act together on the glass pane. The bringing together can be done by vertical movement of the lower bending mould, of the upper shaping tool, or both.

The device according to the invention also includes means for heating the glass pane to softening temperature. Typically, the lower bending mould and the upper shaping tool are arranged within a heatable bending furnace or a heatable bending chamber. For heating, the glass pane can pass through a separate chamber, for example, a tunnel furnace.

The positive pressure is generated by introducing a gas into the hollow space of the shaping tool. In a preferred embodiment, the gas is air, in particular, compressed air, since this is economical to produce. However, in principle, other gases can also be used, for example, carbon dioxide or nitrogen. The gas can be conveyed into the hollow space in any manner, for example, by venturi nozzles, a fan, or a pump.

The inflowing gas is preferably heated so as not to cool the glass pane during the bending process, which typically takes place at elevated temperatures. The temperature of the gas preferably corresponds approx. to the temperature of the glass pane.

In the hollow space, a deflector plate is preferably arranged opposite the pipe outlet such that the inflowing gas strikes the deflector plate. This prevents inflowing gas from striking the glass pane directly, and a homogeneous positive pressure can be generated in the entire hollow space.

The method according to the invention can be carried out in many possible variants. The arranging of the softened glass pane between the lower bending mould and the upper shaping tool can be performed, with the glass pane being held by the upper shaping tool, in particular suctioned and, then, the lower bending mould being moved relative to the upper shaping tool, and, thus, brought near the glass pane from below. This procedure is reasonable, in particular with pressing and suction bending methods. The heating of the glass pane to softening temperature can be done while the glass pane is already fixed on the upper shaping tool, or in an upstream step, wherein the glass pane is not picked up by the upper shaping tool until it is in the heated state.

Alternatively, the glass pane can be placed on the working surface (support surface) of the lower bending mould and, then, the upper shaping tool can be moved relative to the lower bending mould, and, thus, is brought near the glass pane from above. This procedure is reasonable with pressing and suction bending methods and, in particular, with gravity bending methods. The heating of the glass pane to softening temperature can be done after the pane has been placed on the lower bending mould, or in an upstream step, wherein the glass pane is not lowered onto the lower bending mould until it is in the heated state. In gravity bending methods, it is customary to heat the glass pane on the lower bending mould (gravity bending mould).

The positive pressure that is exerted on the glass pane by the membrane is, in an advantageous embodiment, from 10 mbar to 50 mbar, preferably from 20 mbar to 30 mbar. With this, good results are obtained—the shaping of the pane is effectively accelerated and impairments to the surface can be avoided. The term "positive pressure" refers to the positive pressure difference relative to the ambient pressure.

In principle, the glass pane can also already be subjected to the positive pressure during heating. The positive pressure can, to be sure, develop its effect only after reaching the softening temperature; but for process technology reasons, it can be simpler to generate the positive pressure already in advance.

In an advantageous embodiment, the upper shaping tool according to the invention is equipped with the afore-described skirt technology for suctioning the glass pane, in particular in the afore-described hood-like embodiment of the upper shaping tool. The glass pane is picked up by the upper shaping tool from a first lower mould, in that the upper shaping tool is brought near the first lower mould, the glass panes is suctioned, and the upper shaping tool with the glass pane is again removed from the first lower mould.

In a particularly preferred embodiment, said first lower mould is a gravity bending mould with a concave, frame-like contact surface, on which the glass pane has been heated to softening temperature and pre-bent by gravity bending. The gravity bending mould is typically implemented movably, for example, mounted on a cart. The gravity bending mould passes, for heating, through a furnace, with the glass pane being heated to bending temperature and then being transported under the upper shaping tool.

In the context of industrial mass production, it is advantageous to connect a plurality of such movable gravity bending moulds to one another to form a so-called train. The train runs through a furnace for heating the panes to bending temperature and travels into a bending chamber with the lower bending mould according to the invention and the upper shaping tool. In the bending chamber, the glass panes are then picked up from the gravity bending mould by the upper shaping tool. By means of spatial separation of the heating and the positive pressure-supported bending into different chambers of a bending furnace, higher cycle times can be obtained than if the pane is heated only after entering the bending chamber.

Alternatively, it is also possible to combine the first lower mould (in particular, a gravity bending mould with a frame-like contact surface) and the lower bending mould according to the invention in a single tool. The two moulds must, in that case, be vertically movable relative to one another such that it is possible to regulate which of the contact surfaces the glass pane rests on. Thus, a direct transfer of the pane from the first lower mould to the lower bending mould according to the invention is possible without the pane having to be lifted by an upper tool.

In an advantageous embodiment, a lower bending mould according to the invention is brought near the glass pane held on the upper shaping tool. For this, it is particularly preferable to move the upper shaping tool with the glass pane vertically upward, then to move the lower bending mould horizontally under the upper shaping tool, and then to lower the upper shaping tool vertically onto the lower bending mould. Alternatively, the necessary horizontal movement can, however, also be done by the upper shaping tool or a movement of the bending mould and the shaping tool.

The lower bending mould is preferably implemented in the aforedescribed manner as a suction bending mould with a full-surface working surface provided with openings. The at least one glass pane to be bent is pressed in its edge region between the contact surface of the upper shaping tool and the working surface of the lower bending mould. The central region of the glass pane is sucked against the working surface by means of the sucking action of the lower bending mould. While the glass pane is fixed between the lower bending mould and the upper shaping tool, the sucking action of the upper shaping tool holding the glass pane can be switched off or maintained.

The sucking action that is exerted on the glass pane by the lower bending tool is preferably from preferably from 100 mbar to 200 mbar, particularly preferably from 120 mbar to 150 mbar.

The cooling of the glass pane can be done in any manner desired. At the time, the glass pane can be arranged on the lower bending mould according to the invention, be held on the upper shaping tool according to the invention, or even be arranged on another mould onto which the pane has been transferred. The cooling can be done at ambient temperature or by active cooling. The other lower mould can, for example, be the same mould or be of the same type as the first lower mould for gravity bending. Thus, the same train can be used, on the one hand, for pre-bending the panes and transporting them into the press bending chamber and, on the other, for transporting the panes out and cooling them.

The device according to the invention can also include a plurality of upper shaping tools and/or a plurality of lower bending moulds. The device can include, in addition to the lower bending mould according to the invention and the upper shaping tool according to the invention, a lifting tool, which is, for example, equipped with skirt technology. It is thus possible to begin a bending procedure before the preceding bending procedure has completely finished, by which means higher cycle times can be achieved. For example, the following sequence can be selected:

Lifting the pane from the gravity bending mould by the lifting tool

Moving the lower bending mould under the lifting tool and placing the pane down on the lower bending mould Moving the lower bending mould with the pane under the upper shaping tool Bending the pane between the lower bending mould and the upper shaping tool Lifting the pane from the lower bending mould by the upper shaping tool Moving the lower bending mould under the lifting tool, which has, in the meantime, lifted another pane from the next gravity bending mould Placing the pane from the upper shaping tool down onto the gravity bending mould.

Such a method is described in EP 1 836 136 A1 in connection with FIG. 4a-4d.

The glass panes to be bent are provided in particular as vehicle panes (vehicle window panes), preferably automobile panes or as components thereof. They typically have a size of at least 0.8 m$^2$ auf, preferably of 1 m$^2$ to 3 m$^2$.

The glass panes to be bent are made, in a preferred embodiment, of soda lime glass, as is customary for window panes. Typical bending temperatures are from 500° C. to 700° C., preferably from 550° C. to 650° C., for example, approx. 630° C. The glass panes to be bent can, however, also contain other types of glass such as borosilicate glass or quartz glass. The thickness of the glass pane is typically from 0.2 mm to 10 mm, preferably 0.5 mm to 5 mm.

The method according to the invention is in particular also suitable for simultaneously congruently bending multiple, for example, two, glass panes positioned one atop the other. This can, in particular, be desirable when two or more individual individual panes are to be laminated later to form a composite glazing, in order to optimally match their shape to one another. For this, the glass panes are arranged flat one atop the other and bent together. A separation means, for example, a separating powder or a fabric, is arranged between the glass panes, such that the glass panes can again be detached from one another after bending. In an advantageous embodiment, the method is applied to multiple, in particular, two, glass panes positioned one atop the other, and the glass panes are simultaneously bent pairwise.

The method is, in a particularly preferred embodiment, the method that is described in detail in EP 1 836 136 A1, wherein the upper shaping tool according to the invention is used in its hood-like configuration with an air deflector plate instead of the upper mould ("forme supérieure 11") described there. The lower bending mould according to the invention is the lower mould ("forme inférieure 5, 12") described there. The method is preferably carried out using the device described in detail in EP 1 836 136 A1, wherein, likewise, the tool according to the invention is used instead of the upper mould ("forme supérieure 11") described there and the lower bending mould according to the invention is the lower mould ("forme inférieure 5, 12") described there.

The invention also includes the use of a membrane for generating a positive pressure on a surface of a glass pane during a bending process, wherein the membrane closes an opening of a hollow space of a shaping tool and wherein the positive pressure is generated, in that the membrane is deformed in the direction of the glass pane by a gas introduced into the hollow space and the surface of the glass pane is contacted thereby.

In the following, the invention is explained in detail with reference to drawings and exemplary embodiments. The drawings are schematic representations and not to scale. The drawings in no way limit the invention.

Figure 2:
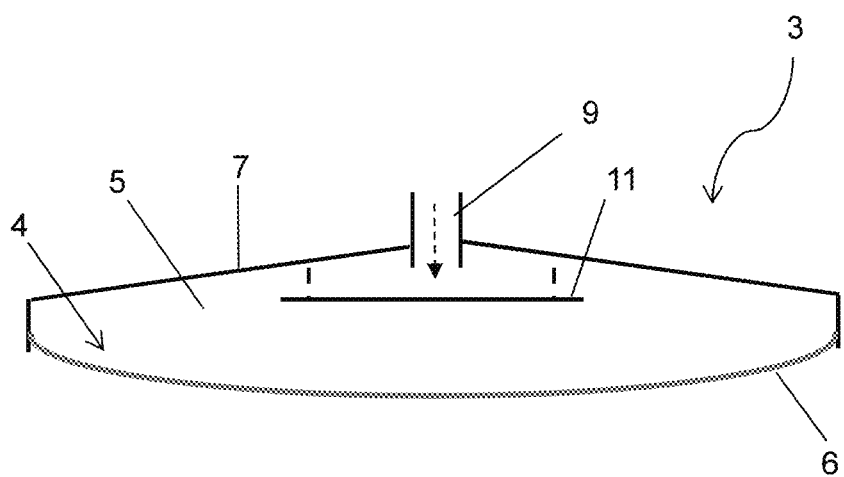
Figure 3:
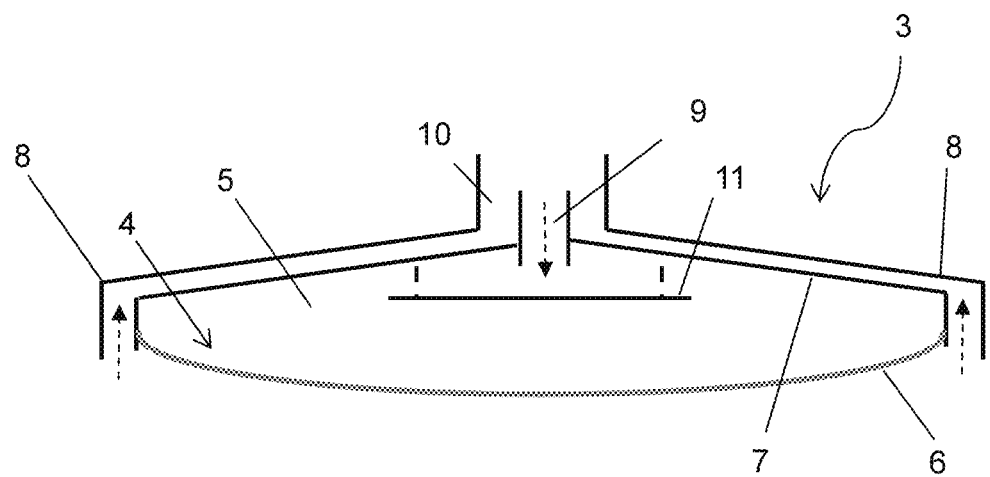
Figure 4:
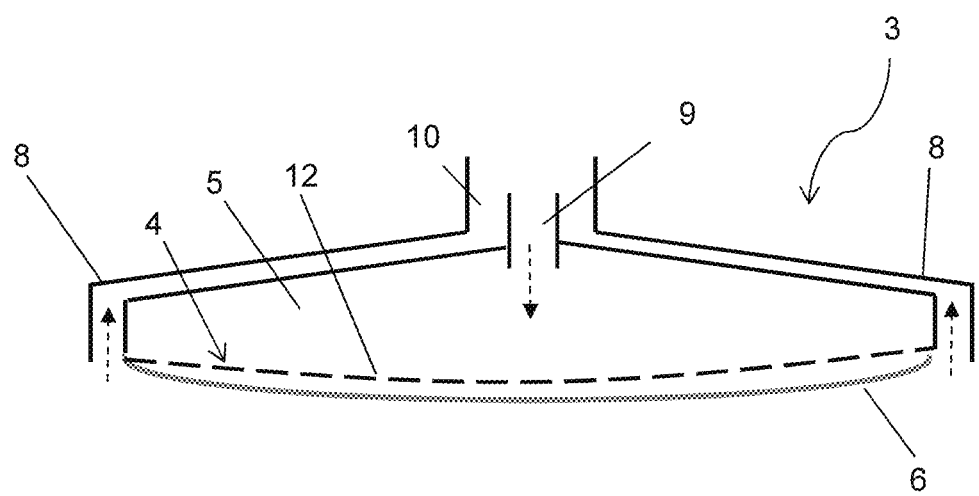
Figure 5:
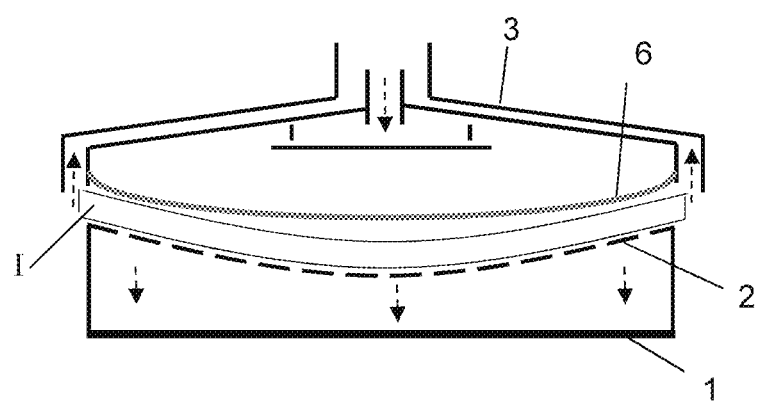
Figure 6:
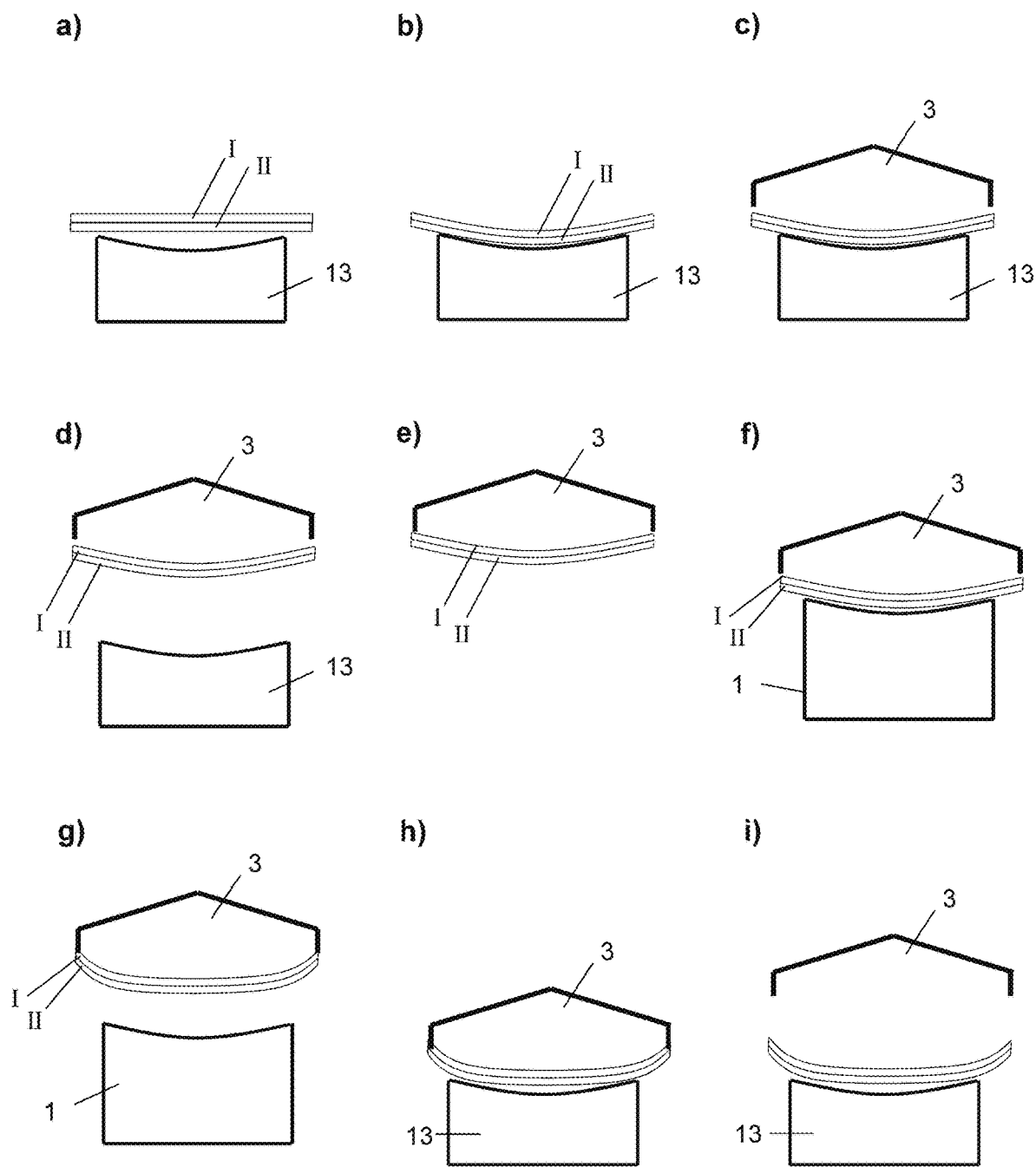
Figure 7:
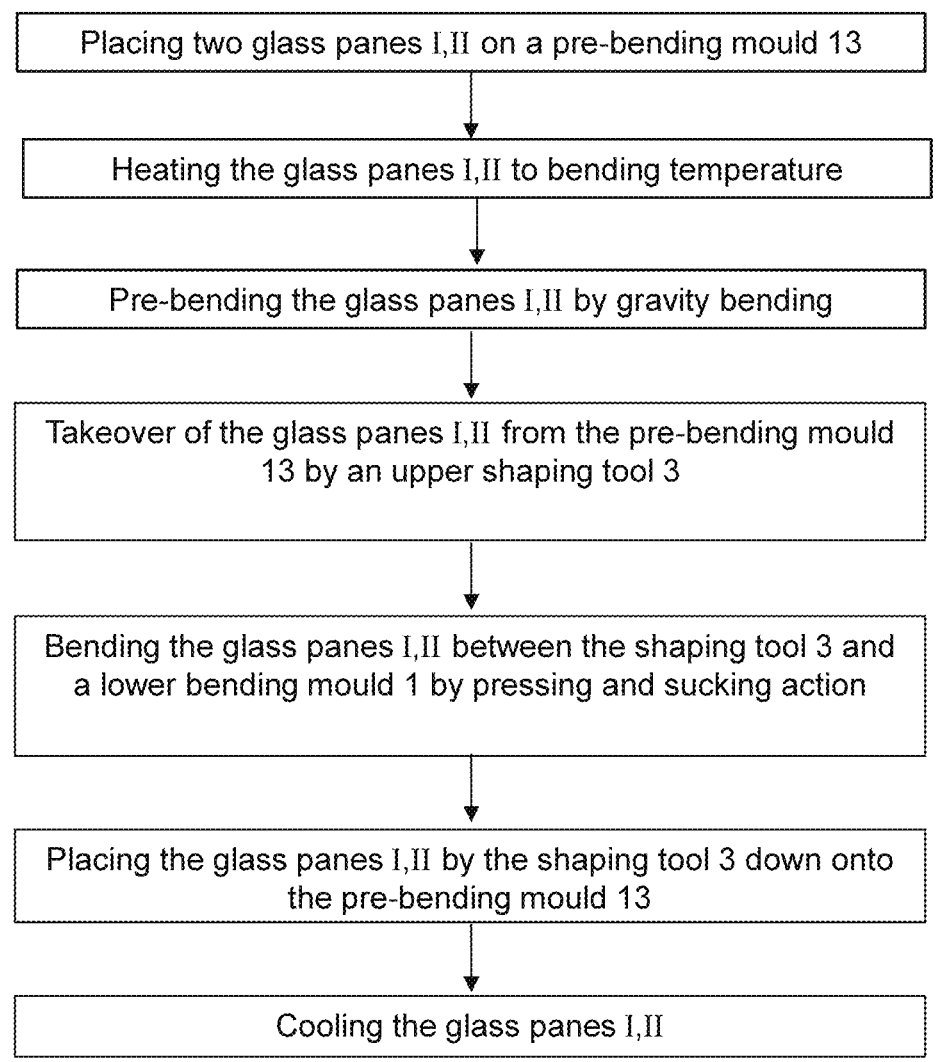

They depict:

FIG. 1 a cross-section through a device according to the invention during the method according to the invention, FIG. 2 a cross-section through an embodiment of the upper shaping tool according to the invention, FIG. 3 a cross-section through another embodiment of the upper shaping tool according to the invention, FIG. 4 a cross-section through another embodiment of the upper shaping tool according to the invention, FIG. 5 a cross-section through another embodiment of the device according to the invention during the method according to the invention, FIG. 6 a stepwise representation of an embodiment of the method according to the invention, and FIG. 7 a flowchart of an embodiment of the method according to the invention.

FIG. 1 depicts a device according to the invention during the method according to the invention for bending a glass pane I. FIG. 2 depicts a detailed view of the upper shaping tool 3 of FIG. 1.

The glass pane I, flat in the initial state, is placed down onto a lower bending mould 1 (FIG. 1a). The lower bending mould is, by way of example, a gravity bending mould with a frame-like, concave working or supporting surface 2. As customary with gravity bending, the glass pane I is heated to a bending temperature that corresponds at least to the softening temperature. The softened glass pane I then clings to the supporting surface 2 under the effect of gravity (FIG. 1b).

The gravity bending is supported by an upper shaping tool 3, which a positive pressure on the upward facing surface O of the glass pane I facing away from the supporting surface 2. The upper shaping tool 3 has a bell-like or hood-like cover 7, which forms a hollow space 5 with a large opening 4, which is oriented toward the glass pane I. An edge section of the cover 7 frames the opening 4. The hollow space 5 is closed by a membrane 6 that is mounted on the edge section of the cover 7.

The cover 7 is formed from a steel plate only 3 mm thick, as a result of which the shaping tool has only a low weight.

The upper shaping tool 3 is equipped with an inflow pipe 9, via which gas, for example, heated compressed air, can flow into the hollow space 5. The flexible membrane 6 expands and is deformed in the direction of the glass pane I. The membrane 6 presses the glass pane into the lower bending mould 1 such that the desired pane shape is achieved more quickly than with pure gravity bending. In the hollow space 5 opposite the opening of the inflow pipe 6 is arranged a deflector plate 11, which the inflowing air strikes. Thus, homogeneous positive pressure is produced in the hollow space 5.

The membrane is made of a stainless steel felt with a material thickness of 3 mm. The felt is, to a certain extent, gas-permeable, such that the compressed air can escape from the hollow space 5 through the membrane 6. Thus, the pressure differential directly above and below the membrane is reduced, by which means imprints on the glass surface O can be avoided.

FIG. 3 depicts another embodiment of the upper shaping tool 3 according to the invention. The shaping tool 3 is configured similarly as in FIG. 2, being, however, dimensioned such that the cover 7 does not protrude beyond the side edge of the glass pane I. A circumferential edge section of the glass pane I to be bent is, consequently, not brought into contact with the membrane 6 and subjected to positive pressure.

The upper shaping tool 3 also has an air deflector plate 8 surrounding the cover 7. The air can be suctioned out of the intermediate space between the air deflector plate 8 and the cover 7 via a suction pipe 10, and an upward-oriented stream of air can be generated. The shaping tool 3 is designed such that this stream of air sweeps the side edge of the glass pane I to be bent. Thus, the glass pane I is suctioned onto the contact surface of the shaping tool arranged on the side edge of the cover 7 and is, for example, held or transported in the context of a multistage bending process. This technique is referred to as a skirt technique. The contact surface of the shaping tool 3 can be convex, in particular when the working surface 2 of the lower bending mould 1 is concave.

FIG. 4 depicts another embodiment of the upper shaping tool 3 according to the invention. In contrast to the above-described embodiments, the shaping tool 3 has not a single, large opening 4, but, instead, an additional convex wall 12, which is oriented toward the lower bending mould 1 and the glass pane I and delimits the hollow space 5. Into this wall are introduced a plurality of openings 4, via which the gas flowing into the hollow space 5 can escape in order to deform the membrane 6, which covers the surface of the wall 12 facing away from the hollow space 5. The size of the openings 4 is, for example, 50 mm$^2$. The share of the area of the openings is, for example, 20% of the entire area of the wall 12 (including the area of the openings 4). The material thickness of the shaping tool is, for example, 20 mm.

Here again, the shaping tool has, as in FIG. 3, a suction pipe 10 together with an air deflector plate 8.

FIG. 5 depicts another embodiment of the device according to the invention during the method according to the invention. The upper shaping tool is configured according FIG. 3. In contrast to FIG. 1, the lower bending mould 1 does not have a frame-like working surface 2, but, instead, has a full-surface concave working surface 2, which is provided to make contact with a large part of the pane surface U. The lower bending mould 1 is not a gravity bending mould, but, instead, is a tool for press bending and suction bending. The glass pane I is pressed, in its edge region, between the contact surface of the upper shaping tool 3 and the working surface 2. A sucking action, which is transferred via openings in the working surface 2 to the pane surface U, is exerted on the central region of the glass pane I surrounded by this edge region. By means of the combined pressing and sucking action, the glass pane I is very quickly and efficiently bent into the shape predefined by the working surface 2. Here, the sucking action is supported by the pressure of the membrane 6.

The figure also shows how the stream of air generated by the air deflector plate 8 sweeps the side edge of the glass pane I. Thus, the glass pane I can, for example, be held on the shaping tool 3 while it is brought near the lower bending mould 1.

FIG. 6 schematically depicts the steps of an embodiment of the method according to the invention. First, two glass panes I, II positioned one atop the other, which are flat, in the initial state, are positioned on a pre-bending mould 13, which is implemented as a gravity bending mould with a frame-like concave supporting surface (Part a). The panes on the pre-bending mould 13 are heated to bending temperature, for example, 600° C., and cling as a result of gravity to the shape of the lower bending mould 9 (Part b). The glass panes I, II are thus pre-bent by means of gravity bending. For this, the pre-bending mould 13 is preferably movably mounted and connected to other pre-bending moulds to form a train. The pre-bending mould 13 runs through a tunnel furnace (not shown) in order to be heated to bending temperature and then travels into a bending chamber (likewise not shown) in which the device according to the invention is arranged.

In said bending chamber, the glass panes I, II are picked up by the upper shaping tool 3 according to the invention. For this, the shaping tool 3 is brought near the glass panes I, II on the pre-bending mould 13 from above (Part c). The shaping tool 3 is configured as in FIG. 3. By means of the skirt technology described there, the glass panes I, II are sucked against the frame-like convex contact surface of the shaping tool 3. The shaping tool 3 is then moved upward, while the glass panes I, II are held by the bending tool 1 and can be moved upward thereby and thus lifted by the pre-bending mould 13 (Part d). After the glass panes I, II have been taken over by the pre-bending mould 13 (Part e), the lower bending mould 1 according to the invention is moved horizontally under the shaping tool 3, and the shaping tool 3 is lowered onto this bending mould 1 (Part f). The lower bending mould 1 is implemented as in FIG. 5 as a combined pressing and suction bending mould. The glass panes I, II are bent into their final shape between the shaping tool 3 according to the invention and the bending mould 1 as described with reference to FIG. 5. The shaping tool 3 is then again lifted from the lower bending mould 1 (Part g), and the lower bending mould 1 is moved away horizontally. The shaping tool 3 is then lowered again, and the glass panes I, II are again placed down onto the pre-bending mould 13 and transferred to this pre-bending mould 13 by turning off the sucking action (Part h). The shaping tool 3 is then moved upward (Part i) and is ready for the bending process of the next pair of panes. The glass panes I, II are transported out of the bending chamber on the movable pre-bending mould 13 and cool to ambient temperature on the pre-bending mould 13.

The process steps schematically presented here reproduce the method described in detail in EP 1 836 136 A1, wherein the upper mould used there (forme supérieure 11) has been replaced by the upper shaping tool 3 according to the invention. The membrane 6 according to the invention effects further improved efficiency of the method.

FIG. 7 depicts the exemplary embodiment according to FIG. 6 with reference to a flowchart.

EXAMPLE

Various bending processes were compared in a series of tests. The bending processes were carried out on a gravity bending mould (lower bending mould 1) with a frame-like supporting surface 2, on which the glass pane I was arranged. The glass pane I were, in each case, heated to the temperature T, and the deformation speed v was measured. The bending processes differed in the design of the upper shaping tool:
1. Pure gravity bending without application of positive pressure (no upper shaping tool 3)
2. Gravity bending using an upper shaping tool in the hood-like design with a cover 7 forming a hollow space 5, but without membrane 6 such that the glass pane I was subjected directly to the stream of air
3. Gravity bending according to the invention with the use of a hood-like upper shaping tool 3 with membrane 6 (design of FIG. 2)

In Examples 2 and 3, air was introduced into the hollow space 5 at the same speed.

Then, the optical properties of the bent pane were examined. For this, the refractive power of the pane was measured with spatial resolution in the primary field of vision of the pane. The maximum value (limit value, max value) and rate of change (RoC; difference between maximum and minimum in a quadratic measurement region with a size of 80 mm×80 mm) were determined; both are customary values for evaluating optical quality, in particular in the automotive sector and are familiar to the person skilled in the art. The smaller the measured value, the more distortion free the pane and, accordingly, the better the optical quality of the pane.

The results are summarised in Table 1.

TABLE 1

| | Bending process | T | v | limit value | RoC |
| --- | --- | --- | --- | --- | --- |
| 1 | Pure gravity bending | 630° C. | 0.1 mm/s | | |
| 2 | Gravity bending with direct exposure to stream of air | 630° C. | 1 mm/s | 85 mdpt | 100 mdpt |
| 3 | According to the invention: Gravity bending with upper shaping tool with membrane | 630° C. | 2.8 mm/s | 50 mdpt | 85 mdpt |

As the table indicates, a significant savings of time can be achieved by the process according to the invention—the bending speed is significantly greater with the use of the membrane according to the invention with otherwise identical test conditions than with direct exposure to a a stream of air and even more so than with pure gravity bending. At the same time, impairment of optical quality is significantly less than with direct exposure to the stream of air. These results were unexpected and surprising for the person skilled in the art.

LIST OF REFERENCE CHARACTERS (1) lower bending mould
(2) working surface/supporting surface of the lower bending mould 1
(3) upper shaping tool
(4) opening of the hollow space 5
(5) hollow space of the shaping tool 3
(6) membrane of the shaping tool 3
(7) cover of the shaping tool 3
(8) air deflector plate of the shaping tool 3
(9) inflow pipe of the shaping tool 3
(10) suction pipe of the shaping tool 3
(11) deflector plate of the shaping tool 3
(12) wall of the shaping tool 3 oriented toward the lower bending mould 1 and delimiting the hollow space 5
(13) pre-bending mould/gravity bending mould
(I) glass pane
(O) upper surface of the glass pane I, facing away from the supporting surface 2
(U) lower surface of the glass pane I, facing the supporting surface 2

The invention claimed is:

1. A device for bending a glass pane with a size of at least 0.8 m2, comprising:
   a lower bending mould with a working surface that is suitable for influencing the shape of the glass pane,
   an upper shaping tool arranged opposite the working surface that is suitable for generating a positive pressure on a main surface of the glass pane facing away from the working surface,
   wherein the upper shaping tool comprises a hollow space with an opening oriented toward the lower bending mould and a membrane closing the opening, the upper shaping tool being equipped with a gas inlet configured to introduce a gas into the hollow space in order to deform the membrane in the direction of the lower bending mould so as to contact the main surface of the glass pane and to thus generate positive pressure,
   wherein the membrane consists of a stainless steel felt, stainless steel fleece, or woven stainless steel fabric, and
   wherein the membrane has a first main surface facing the gas inlet and a second main surface opposite the first main surface, the membrane being gas permeable such that gas introduced by the gas inlet directly impinges on the first main surface of the membrane and is sufficient to deform said membrane so that the second main surface contacts the main surface of the glass pane and exerts said positive pressure on the main surface of the glass pane.

2. The device according to claim 1, wherein the membrane has a thickness of 0.5 mm to 10 mm.

3. The device according to claim 1, wherein the upper shaping tool has a cover that forms the hollow space with an edge section that surrounds the opening.

4. The device according to claim 1, wherein the upper shaping tool has a wall delimiting the hollow space and oriented toward the lower bending mould, and wherein the opening is introduced into the wall.

5. The device according to claim 1, wherein the upper shaping tool has an air deflector plate surrounding the opening and means associated therewith for generating a sucking action such that the shaping tool is suitable for sweeping an edge of the glass pane with a stream of air in order to suck it onto the upper shaping tool.

6. The device according to claim 1, wherein the glass pane is a vehicle window pane and the device is configured and arranged to bend the vehicle window pane.

7. The device according to claim 1, wherein the membrane has a thickness of 1 mm to 5 mm.

8. The device according to claim 1, wherein the membrane has a thickness of 2 mm to 3 mm.

9. The device according to claim 1, where the lower bending mould is a gravity bending mould.

10. A method for bending a glass pane with a size of at least 0.8 m2, comprising:
    providing a glass pane;
    heating the glass pane to its softening temperature; providing a lower bending mould with a working surface;
    providing an upper shaping tool having a membrane and a hollow space with an opening, the membrane closing the opening;
    arranging the upper shaping tool opposite the working surface such that the opening is oriented toward the lower bending mould;
    arranging the glass pane between the lower bending mould and the upper shaping tool;
    introducing, via a gas inlet, a gas into the hollow space to deform the membrane in a direction of the lower bending mould such that the membrane contacts a main surface of the glass pane facing away from the working surface, thereby generating a positive pressure on the main surface of the glass pane, and
    cooling the glass pane,
    wherein the membrane consists of a stainless steel felt, stainless steel fleece, or woven stainless steel fabric, and
    wherein the membrane has a first main surface facing the gas inlet and a second main surface opposite the first main surface, the membrane being gas permeable such that gas introduced by the gas inlet directly impinges on the first main surface of the membrane and is sufficient to deform said membrane so that the second main surface contacts the main surface of the glass pane and exerts said positive pressure on the main surface of the glass pane.

11. The method according to claim 10, wherein the positive pressure is from 10 mbar to 50 mbar.

12. The method according to claim 10, wherein two glass panes positioned one atop the other are simultaneously bent pairwise.

13. The method according to claim 10, wherein the positive pressure is from 20 mbar to 30 mbar.

14. A method for bending a glass pane with a size of at least 0.8 m2, comprising:
    providing a glass pane;
    heating the glass pane to its softening temperature;
    pre-bending the glass pane on a gravity bending mould;
    providing a lower bending mould with a full-surface working surface equipped with working surface openings;
    providing an upper shaping tool having a membrane and a cover forming a hollow space with an opening, the membrane closing the opening, the upper shaping tool further having an edge section surrounding the opening, an air deflector plate surrounding the opening and means associated therewith for generating a sucking action;
    lifting the glass pane with the upper shaping tool from the gravity bending mould;
    generating a stream of air by the air deflector to sweep a side edge of the glass pane;
    placing the lower bending mould underneath the glass pane;
    introducing, via a gas inlet, a gas into the hollow space to deform the membrane in a direction of the lower bending mould such that the membrane contacts a first surface of the glass pane facing away from the working surface, thereby generating a positive pressure on the surface of the glass pane;
    exerting the sucking action through the working surface openings to a second surface of the glass pane facing the working surface;
    placing the glass pane down onto the gravity mould using the upper shaping tool, and
    cooling the glass pane,
    wherein the membrane consists of a stainless steel felt, stainless steel fleece, or woven stainless steel fabric, and
    wherein the membrane has a first main surface facing the gas inlet and a second main surface opposite the first main surface, the membrane being gas permeable such that gas introduced by the gas inlet directly impinges on the first main surface of the membrane and is sufficient to deform said membrane so that the second main surface contacts the first surface of the glass pane and exerts said positive pressure on the first surface of the glass pane.

15. A method of generating a positive pressure on a main surface of a glass pane comprising:

providing a shaping tool with a hollow space; providing a membrane;

closing an opening of the hollow space using the membrane;

introducing, via a gas inlet, a gas in a direction of the glass pane to deform the membrane such that the membrane contacts the main surface of the glass pane thereby generating the positive pressure on the main surface, wherein the membrane consists of a stainless steel felt, stainless steel fleece, or woven stainless steel fabric, and wherein the membrane has a first main surface facing the gas inlet and a second main surface opposite the first main surface, the membrane being gas permeable such that gas introduced by the gas inlet directly impinges on the first main surface of the membrane and is sufficient to deform said membrane so that the second main surface contacts the main surface of the glass pane and exerts said positive pressure on the main surface of the glass pane.

* * * * *